United States Patent [19]

Aizawa et al.

[11] Patent Number: 5,066,727
[45] Date of Patent: Nov. 19, 1991

[54] RESIN FOR TONER AND TONER CONTAINING SAME

[75] Inventors: Hironori Aizawa, Tokyo; Masaaki Shin, Fujisawa; Atsuo Okubo, Yokohama, all of Japan

[73] Assignee: Mitsui Toatsu Chemicals Incorporated, Tokyo, Japan

[21] Appl. No.: 381,748
[22] PCT Filed: Nov. 6, 1987
[86] PCT No.: PCT/JP87/00858
§ 371 Date: Jun. 26, 1989
§ 102(e) Date: Jun. 26, 1989
[87] PCT Pub. No.: WO89/04509
PCT Pub. Date: May 18, 1989
[51] Int. Cl.$^5$ ............... C08F 265/10; C08K 3/04
[52] U.S. Cl. ................ 525/296; 524/847; 526/318; 526/318.2; 526/346; 526/934
[58] Field of Search ............ 525/296; 524/847

[56] References Cited

U.S. PATENT DOCUMENTS 4,535,049 8/1985 Honda et al. .......... 430/110 X
4,837,100 6/1989 Murofushi et al. ...... 430/107 X

FOREIGN PATENT DOCUMENTS 56-87051  7/1981  Japan .
59-26740  2/1984  Japan .
62-62368  3/1987  Japan .
02070029 9/1981  United Kingdom .

Primary Examiner—John C. Bleutge
Assistant Examiner—Vasu S. Jagannathan
Attorney, Agent, or Firm—Oblon, Spivak, McClelland, Maier & Neustadt

[57] ABSTRACT

A toner resin contains a specific polymer as its principal component. The polymer is obtained by mixing 20–80 parts by weight of a low molecular polymer having a number average molecular weight of 1,000–5,000 and a glass transition temperature (Tg) of 40°–75° C., 80–20 parts by weight of a vinyl monomer, 0.01–5 parts by weight of a polymerization initiator and 0–3 parts by weight of a crosslinking agent, dispersing the resultant mixture in an aqueous system and then polymerizing same. The toner resin has excellent low-temperature fixing property and offsetting resistance, can provide marks of superb vividness, and also can prevent modifications of copied marks, for example, due to transfer of a plasticizer.

16 Claims, No Drawings

RESIN FOR TONER AND TONER CONTAINING SAME

TECHNICAL FIELD

This invention relates to a resin suitable for use in an electrophotographic toner which is adapted to develop electrophotographic latent images in electrophotography, electrostatic recording, electrostatic printing and the like.

BACKGROUND ART

In electrophotography, the copying speed tends to increase further in recent years to meet the ever increasing quantity of information to be dealt with. On the other hand, it is desired in electrophotography that copied marks have the same quality from the first copy to the several ten thousandth copy.

In order to obtain vivid marks even in high-speed copying, it has conventionally attempted to improve toner resins by placing importance on heat-melting characteristics such as low-temperature fixing property and offsetting resistance as well as the electrification stability of toners.

With a view toward attaining such a goal, the present inventors have already developed a new technique in which a styrene resin having a lower molecular weight (Mn: 1,000-5,000) is used as a toner resin (PCT/JP 87/00819).

However, polyvinyl chloride (PVC) resistance has recently come to the surface as a new problem. When a sheet of paper bearing a price or the like copied thereon by way of example is left over under a load on a PVC sheet for one week, some of the marks copied is caused to transfer to the PVC sheet and for example, one zero (0) disappears from the copied paper sheet. This will certainly causes a serious problem because the price has been reduced by one figure. Further, the PVC sheet has been smeared by the sticky tone deposited thereon, thereby causing another problem.

As a result of a follow-up test, it was found that the above-mentioned technique developed by the present inventors is not fully satisfactory in PVC resistance although it is extremely good in low-temperature fixing property, offsetting resistance, mark vividness and other properties. As possible reasons for this insufficiency, it may be mentioned that since the styrene-base resin has strong absorbing capacity for a plasticizer such as dioctyl phthalate in the PVC sheet, the plasticizer is caused to migrate into the toner and the toner is plasticized as a result.

DISCLOSURE OF THE INVENTION

An object of this invention is to provide a toner resin, which has excellent fixing property and also significantly-improved PVC resistance, by dissolving a low molecular polymer in a monomer, dispersing the resultant mixture in an aqueous system and then polymerizing same.

The above object of this invention has been fulfilled by the provision of a toner resin which comprises as a principal component a polymer obtained by mixing 20-80 parts by weight of a low molecular polymer having a number average molecular weight of 1,000-5,000 and a glass transition temperature (Tg) of 40°-75° C., 80-20 parts by weight of a vinyl monomer, the sum of said low molecular polymer and vinyl monomer being 100 parts by weight, 0.01-5 parts by weight of a polymerization initiator and 0-3 parts by weight of a crosslinking agent, dispersing the resultant mixture in an aqueous system and then polymerizing same.

BEST MODE FOR CARRYING OUT THE INVENTION

The low molecular polymer useful in the practice of this invention may preferably be that produced by feeding a vinyl monomer, a polymerization initiator and a solvent continuously into a system of 190°-230° C. and polymerizing them in a liquid state by solution polymerization. Illustrative examples of the vinyl monomer include acrylic esters such as methyl acrylate, ethyl acrylate, propyl acrylate, butyl acrylate, octyl acrylate, cyclohexyl acrylate, lauryl acrylate, stearyl acrylate, benzyl acrylate, furfuryl acrylate, tetrahydrofurfuryl acrylate, hydroxyethyl acrylate, hydroxybutyl acrylate, dimethylaminomethyl acrylate and dimethylaminoethyl acrylate; methacrylic esters such as methyl methacrylate, ethyl methacrylate, propyl methacrylate, butyl methacrylate, octyl methacrylate, lauryl methacrylate, stearyl methacrylate, cyclohexyl methacrylate, benzyl methacrylate, furfuryl methacrylate, tetrahydrofurfuryl methacrylate, hydroxyethyl methacrylate, hydroxypropyl methacrylate, hydroxybutyl methacrylate, dimethylaminomethyl methacrylate and dimethylaminoethyl methacrylate; aromatic vinyl monomers such as vinyltoluene, α-methylstyrene, chlorostyrene and styrene; dialkyl esters of unsaturated dibasic acids, such as dibutyl maleate, dioctyl maleate, dibutyl fumarate and dioctyl fumarate; vinyl esters such as vinyl acetate and vinyl propionate; nitrogen-containing vinyl monomers such as acrylonitrile and methacrylonitrile; unsaturated carboxylic acids such as acrylic acid, methacrylic acid and cinnamic acid; unsaturated dicarboxylic acids such as maleic acid, maleic anhydride, fumaric acid and itaconic acid; monoesters of unsaturated dicarboxylic acids, such as monomethyl maleate, monoethyl maleate, monobutyl maleate, monooctyl maleate, monomethyl fumarate, monoethyl fumarate, monobutyl fumarate and monooctyl fumarate; styrenesulfonic acid; acrylamide; methacrylamide; N-substituted acrylamides; N-substituted methacrylamides; acryamide propanesulfonic acid; etc. At least one of these monomers is used. Among these, acrylic esters, methacrylic esters, styrene, dialkyl fumarates, acrylonitrile, methacrylic acid, cinnamic acid, the fumaric monoesters, acrylamide, methacrylamide are particularly preferred.

A polymerization initiator is usually employed when the low molecular polymer is produced by polymerizing the vinyl monomer in the present invention. As exemplary polymerization initiators useful in the practice of this invention, may be mentioned azo type initiators such as 2,2'-azobisisobutylonitrile, 2,2'-azobis(4-methoxy-2,4-dimethylvaleronitrile), 2,2'-azobis (-2,4-dimethylvaleronitrile), 2,2'-azobis(-2-methylbutyloni-trile), dimethyl-2,2'-azobisisobutylate, 1,1'-azobis(1-cyclohexanecarbonitrile), 2-(carbamoylazo)-isobutylonitrile, 2,2'-azobis(2,4,4-trimethylpentane), 2-phenylazo-2,4-dimethyl-4-methoxyvaleronitrile and 2,2'-azobis(2-methylpropane); ketone peroxides such as methyl ethyl ketone peroxide, acetyl acetone peroxide and cyclohexanone peroxide; peroxy ketals such as 1,1-bis(t-butylperoxy)-3,3,5-trimethylcyclohexane, 1,1-bis(butylperoxy)cyclohexane and 2,2-bis(t-butylperoxy)butane; hydroperoxides such as t-butyl hydroperoxide, cumene hydroperoxide and 1,1,3,3-tetramethylbutyl hydroperoxide; dialkyl peroxides such as di-t-butyl peroxide, t-butyl cumyl peroxide, dicumyl peroxide, 2,5-dimethyl-2,5-di(t-butylperoxy)hexane and α,α'-bis(t-butylperoxyisopropyl)benzene; diacyl peroxides such as isobutyryl peroxide, octanoyl peroxide, decanoyl peroxide, lauroyl peroxide, 3,5,5-trimethylhexanoyl peroxide, benzoyl peroxide and m-toluoyl peroxide; peroxy dicarbonates such as di-isopropylperoxy dicarbonate, di-2-ethylhexylperoxy dicarbonate, di-n-propylperoxy dicarbonate, di-2-ethoxyethylperoxy carbonate, di-methoxyisopropylperoxy dicarbonate and di(3-methyl-3-methoxybutyl)peroxy dicarbonate; sulfonyl peroxides such as acetylcyclohexylsulfonyl peroxide; peroxy esters such as t-butyl peroxyacetate, t-butyl peroxyisobutylate, t-butyl peroxyneodecanoate, cumyl peroxyneodecanoate, t-butyl peroxy-2-ethylhexanoate, t-butyl peroxylaurate, t-butyl peroxybenzoate, t-butyl peroxyisopropylcarbonate and di-t-butyl diperoxyisophthalate; and so on. It is particularly preferred to use a polymerization initiator of the dialkyl peroxide type such as di-t-butyl peroxide, t-butyl cumyl peroxide or dicumyl peroxide among the above-exemplified polymerization initiators. The polymerization initiator may generally be used in an amount of 0.01-10 parts by weight per 100 parts by weight the vinyl monomer charged, although it varies depending on the reaction temperature.

As a process for producing the low molecular polymer by polymerizing the vinyl monomer with the polymerization initiator in the present invention, solution polymerization is preferred as mentioned above. As a solvent useful in the practice of the polymerization, may be mentioned an aromatic hydrocarbon such as benzene, toluene, ethylbenzene, orthoxylene, metaxylene, paraxylene or cumene, ethyl acetate, Solvesso #100 (trade name; product of Esso Kagaku K. K.), Solvesso #150 (trade name; product of Esso Kagaku K. K.), or the like. They may generally be used either singly or in combination. It is also possible to choose other solvents in order to regulate the molecular weight.

Taking the production of a low molecular weight polymer by solution polymerization by way of example, a further detailed description will hereinafter be made. As an exemplary process, a vinyl monomer is subjected to single-stage or multi-stage polymerization by continuously charging a homogeneous solution of the vinyl monomer, a solvent and a polymerization initiator into a pressure reactor filled up with a mixed solvent and heated to 190°-230° C. in advance while maintaining constant the internal pressure of the reactor. Here, it is suitable to provide a pressure control valve, which detects the internal pressure and either opens or closes as needed, with a discharge outlet for the polymerization mixture so as to maintain the internal pressure constant. Then, while maintaining at the polymerization temperature the temperature around the outlet, the polymerization mixture is flashed continuously into a vacuum system of about 0-200 mmHg so that the solvents and the like are allowed to evaporate. As a result, the resultant low molecular polymer and the mixed solvent are separated from each other, thereby obtaining the low molecular polymer in a solid form. As another process exemplary process, a homogeneous solution of a vinyl monomer, a solvent and a polymerization initiator is continuously charged into a pressure vessel, which has been charged with a small amount of the solvent in advance, while maintaining the internal pressure constant. When the vessel has been filled up substantially, the feeding is stopped and the solution of the resultant low molecular polymer is flashed into a vacuum system. Thereafter, the low molecular polymer is collected in the same manner.

The low molecular polymer obtained in the above manner is supposed to have a number average molecular weight of 1,000-5,000, with 1,500-2,800 being preferred. If it is greater than 5,000, it is difficult to achieve fixing with a smaller heat quantity. If it is smaller than 1,000 on the contrary, it is impossible to obtain a glass transition temperature (Tg) of at least a predetermined level, leading to poor blocking resistance. Further, the glass transition temperature (Tg) of the above low molecular polymer is required to be 40°-75° C., preferably, 45°-70° C. Any glass transition temperatures lower than 40° C. result in resins, the blocking resistance of which is so poor that the resins are unsuitable for the production of toners. If the glass transition temperature is higher than 75° C. on the other hand, the fixing property under a smaller heat quantity is deteriorated, thereby failing to obtain any resin intended for use in the present invention.

In the present invention, the ratio of the low molecular polymer to the vinyl monomer in which the polymer is dissolved is 20/80-80/20, preferably, 30/70-70/30 in terms of weight ratio. If the low molecular polymer is used in an amount smaller than 20/80, it is impossible to exhibit fixing property under a smaller heat quantity. If its ratio is greater than 80/20 on the other hand, the strength of the resulting resin is reduced, and a toner making use of such a resin is easily rubbed off for the lack of sufficient strength even when the toner can be fixed. Moreover, the toner undergoes offsetting to impair the quality of marks.

In the present invention, the low molecular polymer obtained in the above-described manner is dissolved in the vinyl monomer, followed by further polymerization. As a polymerization process, solution polymerization, emulsion polymerization or suspension polymerization is employed generally. Suspension polymerization which is carried out in a state dispersed in an aqueous system is however used in the present invention. Solution polymerization is not considered to be preferable, because this process is difficult to achieve any high molecular weight due to a chain transfer by a solvent and even if a high molecular weight should be achieved, the resulting resin is too viscous to permit easy handling. Emulsion polymerization is not applicable on the other hand, because the low molecular polymer is contained in the vinyl monomer and emulsification is hence not feasible. Accordingly, the simplest suspension polymerization is used. Namely, the aforementioned low molecular polymer is mixed and dissolved under stirring in the vinyl monomer described above. After addition and dissolution of the crosslinking agent and a small amount of the polymerization initiator, water and a dispersion stabilizer such as polyvinyl alcohol or gelatin are added. The system is then converted into a suspended state, followed by polymerization under heat.

It is preferable to use a crosslinking agent in suspension polymerization. The PVC resistance can be improved significantly by using a crosslinking agent. As usable crosslinking agents, may be mentioned compounds copolymerizable with the vinyl monomer described above. It is possible to use, for example, divinylbezene, (poly)ethylene glycol diacrylate, (poly)ethylene glycol dimethacrylate or the like. As the crosslinking agent is used in a greater amount, the gel content increases and the PVC resistance becomes better. It is preferable to use the crosslinking agent in an amount of 0.05-3 parts by weight, more preferably, 0.05-1 part by weight per 100 parts by weight of the sum of the low molecular polymer and vinyl monomer. Any amounts smaller than 0.05 part by weight are too little to bring about substantial effects. On the other hand, any amounts greater than 3 parts by weight result in an increase to the viscosity, whereby the flow characteristics under heat are deteriorated and more difficulties are encountered in achieving the fixing under a smaller heat quantity. Incidentally, the term "gel content" as used herein means the content of an insoluble matter which occurs upon dissolution of a resultant polymer in tetrahydrofuran (THF). The content of such an insoluble matter may preferably be 2-48 wt. %.

As a polymerization initiator useful in the above suspension polymerization, the above-exemplified polymerization initiators are all usable. Preferable polymerization initiators are also identical to those mentioned above. As the polymerization initiator, it is preferable to use at least two polymerization initiators in combination, one being an ordinary polymerization initiator employed to promote the polymerization reaction and the other a polymerization initiator used for reducing any remaining portion of the monomer. As the latter polymerization initiator, a polymerization initiator having a half-life decomposition temperature higher than that of the former polymerization initiator is employed usually. Regarding their amounts, it is preferable to use the former in an amount of 0.01-4.0 parts by weight and the latter in an amount of 0-1.0 part by weight, both, per 100 parts by weight of the sum of the low molecular polymer and vinyl monomer. They may hence be used in a total amount of 0.01-5 parts by weight per 100 parts by weight of the sum of the low molecular polymer and vinyl monomer. Any total amounts smaller than 0.01 part by weight require too much time for the polymerization, whereas any total amounts greater than 5 parts by weight encounter difficulties in increasing the molecular weight of the polymer and moreover lead to more cleavage residue of the polymerization initiators so that adverse effects are given to certain electrical characteristics.

When the vinyl monomers with the low molecular polymer, crosslinking agent and polymerization initiator dissolved therein is dispersed in an aqueous system in the present invention, it is possible to use a dispersion stabilizer such as polyvinyl alcohol or gelatin, a surfactant, a pH modifier, and an inorganic additive such as calcium phosphate or magnesium carbonate in order to stabilize particles to be suspended.

The resulting aqueous dispersion is then heated to 60°-90° C., at which polymerization is allowed to proceed. The polymerization is thereafter conducted at 80°-120° C. in order to remove any remaining portion of the monomer. After completion of the polymerization, the polymerization mixture is washed thoroughly to remove the dispersion stabilizer. Subsequent filtration and drying can provide a toner resin according to this invention.

A toner, to which the resin of this invention is applied, is a powder-like dry toner basically. The above-described resin as a principal component of the toner is hence required to be solid at room temperature. It is also required that after formulation into a toner, the resin does not cause blocking even when left over for a long period of time. From such viewpoints, the glass transition temperature of the resin may preferably be at least 40° C., with at least 50° C. being more preferred. From the standpoint of low-temperature fixing property, it is preferable that the resin softens at a temperature as low as feasible. In view of this preferable requirement, the glass transition point may preferably be not higher than 90° C., notably, 80° C. or lower.

Within ranges not impairing effects of the present invention, the resin of this invention may be added with one or more of blending resins - such as polyvinyl chloride, polyvinyl acetate, polyolefins, polyesters, polyvinyl butyral, polyurethanes, polyamides, rosin, modified rosin, terpene resins, phenol resins, aliphatic hydrocarbon resins, aromatic petroleum resins, paraffin wax and polyolefin waxes - and one or more additives as needed.

The resin of this invention may be formulated into a toner by mixing it with a coloring agent. As usable exemplary coloring agents, may be mentioned black pigments such as carbon black, acetylene black, lamp black and magnetite; as well as organic pigments and other inorganic pigments known in the art, such as chrome yellow, yellow iron oxide, Hansa Yellow G, quinoline yellow lake, Permanent Yellow NCG, molybdenum orange, Vulcan Orange, Indanthrenes, Brilliant Orange GK, red iron oxide, Brilliant Carmine 6B, alizarin lake, methyl violet lake, Fast Violet B, cobalt blue, alkali blue lake, phthalocyanin blue, Fast Sky Blue, Pigment Green B, malachite green lake, titanium oxide and zinc white. They may each be used in an amount of 5-250 parts by weight per 100 parts by weight of the resin.

The toner resin of this invention may be selectively added, for example, with nigrosine, a known charge control agent led by a metal-containing azo dye, a pigment dispersant, an offset inhibitor and the like and may then be converted into a toner by a method known per se in the art. Namely, the resultant resin mixture with the above various additives incorporated therein is premixed in a powdery form, kneaded in a heated and melted state by a kneader such as hot roll, Banbury mixer or extruder, cooled, comminuted finely by means of a pulverizer, and then classified by a pneumatic classifier to collect particles, generally, in a range of 8-20 μm as a toner.

The present invention will hereinafter be described in further detail by the following Examples, in which all designations of "part" or "parts" and "%" mean part or parts by weight and wt. % unless otherwise specifically indicated.

The measurement of each number average molecular weight by gel permeation chromatography (GPC) was conducted under the following conditions:
GPC apparatus: JASCO TWINCLE HPLC
Detector: SHODEX RI-SE-31
Column: SHODEX GPCA-80M×2+KF-802×1
Solvent: Tetrahydrofuran (THF)
Flow Rate: 1.2 ml/min
Sample: 0.25% THF solution Copying characteristics were determined under the following conditions by using a photographic copying machine EP870 (trade name manufactured by MINOLTA CAMERA CO., LTD.) which was equipped with a TEFLON(trade mark)-coated hot roll.

Fixing Property

An eraser ("MONO", trade mark; plastic eraser produced by K. K. Tombo Enpitsu) was reciprocated 20 times under a constant load between a solid black area and the white background of each copy. The degree of separation of the toner from the solid black area and the extent of smear of the white background were observed. The following evaluation standard was followed.

: Not separated at all; excellent.
: Separated very little; good.
Δ: Separated slightly; fair.
X: Separated, substantial smear; poor.

Background Smear

In a continuous copying operation, the white background of the 100th copy and that of the 10,000th copy were compared. The background smear was evaluated in accordance with the degree of smear of the white background of the latter copy worsened due to scattered toner and the like. Results were ranked in accordance with the following standard.
: Good.
Δ: Smear was noticeable through a magnifier of x30 magnification, fair.
X: Smear was noticeable by the naked eyes, poor.

Offsetting Resistance

The term "offsetting" as used herein means a phenomenon or problem that a toner adheres partly on a fixing roll and after full single rotation of the roll, the toner then adheres the white background of the paper sheet thereby to smear the paper sheet. The offsetting resistance upon continuous copying of 10,000 sheets was ranked in accordance with the following standard.
: No offsetting.
X: Offsetting occurred.

Blocking Resistance

Toners were left over at 50° C. for 1 week. Their blocking resistance was evaluated in accordance with the following standard.
: Blocking not occurred at all.
Δ: Some blocking occurred but disintegrated by a slight force.
X: Blocking occurred and not disintegrated by a slight force.

PVC Resistance

A PVC sheet was placed over each copied paper sheet and a weight of 100 g/cm$^2$ was placed further on the upper side of the PVC sheet. After allowing them to stand at 40° C. for 1 week, the PVC sheet was peeled off. It was observed how the PVC was peeled off. The extent of toner adhesion was also observed. Observation results were ranked in accordance with the following standard.
⊚: No resistance was experienced at all upon peeling off PVC sheet from its corresponding copied paper sheet. No changes were observed at all on both PVC sheet and copied paper sheet.
◯: PVC sheet was free from deposition of its corresponding toner but was loudly peeled off. A portion of the toner became viscous.
Δ: Some toner was transferred to PVC sheet but most of the toner still remained on the copied paper sheet.
X: A majority of toner moved to PVC sheet.

EXAMPLE 1

A homogeneous solution containing 0.5 part of di-t-butyl peroxide per 100 parts of styrene in a mixed solvent composed of 70 parts of styrene and 30 parts of a mixed solvent of xylene and ethylbenzene was charged continuously at a rate of 750 cc/hr into a 5-l reactor whose internal temperature and pressure were maintained at 210° C. and 6 kg/cm$^2$ respectively, whereby polymerization was carried out. The polymerization mixture was flashed into a vessel of 200° C. and 10 mmHg so as to distill off the solvent.

The number average molecular weight of a low molecular polymer (A) thus obtained was 2,100, while its Tg was 57° C.

Fifty parts of the thus-obtained low molecular polymer (A) were dissolved together with 30 parts of styrene in 20 parts of n-butyl methacrylate, followed by further addition of 0.5 part of benzoyl peroxide, 0.2 part of PERBUTYL I (trade name; t-butyl peroxyisopropylcacbonate produced by Nippon Oil and Fats Co., Ltd.) and 0.1 part of ethylene glycol dimethacrylate. They were dissolved uniformly. The resultant mixture was poured into 1,000 cc of water which contained 1 part of polyvinyl alcohol and 5 parts of calcium hydrogenphosphate, so that the mixture was dispersed into a suspended state. The dispersion was heated to 80° C., at which polymerization was allowed to proceed for 8 hours. The polymerization mixture was then heated to 120° C. under pressure, at which the remaining monomer was polymerized for 3 hours. Water was filtered off, and the resultant resin was washed twice with water and was then dried.

The thus-obtained resin (100 parts) was dispersed and mixed with 7 parts of carbon black (MA-100, trade name; product of Mitsubishi Chemical Industries, Ltd.), 2 parts of a charge control agent (Spiron Black TRH, trade name; product of Hodogaya Chemical Co., Ltd.) and 5 parts of polypropylene wax (Viscohol 550P, trade name; product of Sanyo Chemical Industries, Ltd.) in a Henschel mixer to obtain a toner in the form of a lump. After grinding it coarsely into about 1 mm granules, the granules were comminuted finely in a jet mill and then classified by a pneumatic classifier, so that toner particles of 5–20 μm (average particle size: about 11 μm) were obtained.

In a twin-shell blender, 4 parts of the above toner, 100 parts of a ferrite type carrier (F-150, trade name; product of Nihon Teppun K. K.) and 0.2 part of Aerosil (trade mark, type: R-972 (trade name); product of Japan Aerosil Co., Ltd.) were blended together into a two-component developer.

The copying applicability of the developer was investigated. Results are shown in Table 1.

EXAMPLES 2–5 & COMPARATIVE EXAMPLES 1 AND 2

Toners were separately produced in the exactly same manner as in Example 1 except that the polymerization temperature of the low molecular polymer was changed to 190°, 200°, 220°, 230°, 180° and 240° C. respectively. Their copying applicability was thereafter investigated. Results are summarized in Table 1.

COMPARATIVE EXAMPLE 3

Suspension polymerization was conducted in exactly the same manner as in Example 1 except that the low molecular polymer (A) was not dissolved in Example 1. A resin thus obtained was washed with water and then dried. Using a mixture composed of 50 parts of the thus-obtained resin (B) and 50 parts of the low molecular polymer (A), a developer was obtained in exactly the same manner as in Example 1. The copying applicability of the developer was investigated. Results are also shown in Table 1.

EXAMPLES 6 and 7 & COMPARATIVE EXAMPLES 4 and 5

Toners were separately produced in exactly the same manner as in Example 1 except that the ratio of the low molecular polymer (A) to the vinyl monomer, which were subjected subsequently to suspension polymerization, was changed to 70/30, 30/70, 90/10 and 10/90 respectively. Their copying applicability was investigated. Results are summarized in Table 2.

COMPARATIVE EXAMPLE 6

A toner was produced in exactly the same manner as in Example 1 except that 56 parts of styrene and 14 parts of butyl acrylate were used in lieu of 70 parts of styrene. Its copying applicability was investigated. Results are also shown in Table 2.

EXAMPLES 8–11 & COMPARATIVE EXAMPLES 7 and 8

Toners were separately produced in exactly the same manner as in Example 1 except that the conditions for suspension polymerization were changed to those respectively shown in Table 3-1. Their copying applicability was investigated. Results are summarized in Table 3-2.

TABLE 1

|  |  | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|---|
| low molecular polymer | Composition | ST 100 | ST 100 | ST 100 | ST 100 | ST 100 | ST 100 | ST 100 | ST 100 |
|  | Polymerization temperature (°C.) | 210 | 190 | 200 | 220 | 230 | 180 | 240 | 210 |
|  | Number average molecular weight | 2100 | 3900 | 2800 | 1500 | 1100 | 5400 | 980 | 2100 |
|  | Tg (°C.) | 57 | 70 | 66 | 50 | 45 | 76 | 4 | 57 |
| solution | low molecular polymer (weight)/ Vinyl monomer (weight) | 50/50 | 50/50 | 50/50 | 50/50 | 50/50 | 50/50 | 50/50 | 50/50 mixed after polymerization |
|  | Vinyl monomer composition ST (wt. parts) | 60 | 60 | 60 | 60 | 60 | 60 | 60 | 60 |
|  | n-BMA (wt. parts) | 40 | 40 | 40 | 40 | 40 | 40 | 40 | 40 |
| Gel content (%) |  | 6.8 | 7.0 | 6.8 | 6.5 | 6.4 | 7.2 | 5.3 | 7.5 |
| properties of toner | Fixing property | ⊙ | ⊙ | ⊙ | ⊙ | ⊙ | ○ | ○ | Δ |
|  | Offsetting resistance | ○ | ○ | ○ | ○ | ○ | ○ | ○ | X |
|  | Blocking resistance | ○ | ○ | ○ | ○ | ○ | ○ | X | ○ |
|  | Background smear resistance | ○ | ○ | ○ | ○ | ○ | Fogging | Fogging | Fogging |
|  | PVC resistance | ○-Δ | ○-Δ | ○-Δ | ○-Δ | ○-Δ | ○-Δ | X | X |

ST . . . Styrene
n-BMA . . . n-Butyl methacrylate

TABLE 2

|  |  | Ex. 6 | Ex. 7 | Comp. Ex. 4 | Comp. Ex. 5 | Comp. Ex. 6 |
|---|---|---|---|---|---|---|
| low molecular polymer | Composition | ST 100% | ST 100% | ST 100% | ST 100% | ST 80 BA 20 |
|  | Polymerization temperature (°C.) | 210 | 210 | 210 | 210 | 210 |
|  | Number average molecular weight | 2100 | 2100 | 2100 | 2100 | 2200 |
|  | Tg (°C.) | 57 | 57 | 57 | 57 | 38 |
| solution | low molecular polymer (weight)/ Vinyl monomer (weight) | 70/30 | 30/70 | 90/10 | 10/90 | 50/50 |
|  | Vinyl monomer composition ST (wt. parts) | 60 | 60 | 60 | 60 | 60 |
|  | n-BMA (wt. parts) | 40 | 40 | 40 | 40 | 40 |
| Gel content (%) |  | 2.6 | 19 | 0.8 | 56 | 6.5 |
| properties of toner | Fixing property | ⊙ | ⊙ | ⊙ | X | ⊙ |
|  | Offsetting resistance | ○ | ○ | X | ○ | ○ |
|  | Blocking resistance | ○ | ○ | ○ | ○ | X |
|  | Background smear resistance | ○ | ○ | ○ | ○ | Fogging |
|  | PVC resistance | Δ | ○ | X | ○ | X |

BA . . . Butyl acrylate

TABLE 3-1

|  |  | Ex. 8 | Ex. 9 | Ex. 10 | Ex. 11 | Comp. Ex. 7 | Comp. Ex. 8 |
|---|---|---|---|---|---|---|---|
| low molecular polymer | Composition | ST 100 | ST 100 | ST 100 | ST 100 | ST 100 | ST 100 |
|  | Polymerization temperature (°C.) | 210 | 210 | 210 | 210 | 210 | 210 |
|  | Number average molecular weight | 2100 | 2100 | 2100 | 2100 | 2100 | 2100 |
|  | Tg (°C.) | 57 | 57 | 57 | 57 | 57 | 57 |

TABLE 3-1-continued

|  |  | Ex. 8 | Ex. 9 | Ex. 10 | Ex. 11 | Comp. Ex. 7 | Comp. Ex. 8 |
|---|---|---|---|---|---|---|---|
| Solution, and Conditions for suspension polymerization | low molecular polymer (weight)/ Vinyl monomer (weight) | 50/50 | 50/50 | 50/50 | 50/50 | 50/50 | 50/50 |
|  | Vinyl monomer composition (wt. parts) | ST 37.5 BA 12.5 | ST 37.5 BA 12.5 | ST 37.5 BA 12.5 | ST 25 MMA 12.5 BA 12.5 | ST 37.5 BA 12.5 | ST 37.5 BA 12.5 |
|  | Catalyst Lauryl peroxide (wt. part) PERBUTYL I | 0.5 0.2 | 1.0 0.2 | 0.5 0.2 | 0.5 0.2 | 0.5 0.2 | 5 0.2 |
|  | Crosslinking agent Divinylbenzene (wt. part) | 0.2 | 0.2 | 0.5 | 0.2 | 3.5 | 0.2 |

TABLE 3-2

|  |  | Ex. 8 | Ex. 9 | Ex. 10 | Ex. 11 | Comp. Ex. 7 | Comp. Ex. 8 |
|---|---|---|---|---|---|---|---|
| Gel content (%) |  | 8.7 | 6.4 | 15 | 8.6 | 53 | 1.6 |
| properties of toner | Fixing property | ⊚ | ⊚ | ⊚ | ⊚ | X | ⊚ |
|  | Offsetting resistance | ○ | ○ | ○ | ○ | ○ | X |
|  | Blocking resistance | ○ | ○ | ○ | ○ | ○ | Δ |
|  | Background smear resistance | ○ | ○ | ○ | ○ | ○ | ○ |
|  | PVC resistance | ○ | ○-Δ | ○ | ○ | ○ | X |

MMA ... methyl methacrylate

We claim:

1. A toner resin comprising as a principal component a polymer obtained by mixing 20-80 parts by weight of a low molecular weight polymer having a number average molecular weight of 1,000-5,000 and a glass transition temperature (Tg) of 40°-75° C., wherein said low molecular weight polymer is prepared by polymerizing monomers selected from the group consisting of acrylic esters, methacrylic esters, aromatic vinyl monomers, dialkyl esters of unsaturated dibasic acids, vinyl esters, nitrogen-containing vinyl monomers, unsaturated monocarboxylic acids, unsaturated dicarboxylic acids, monoesters of unsaturated dicarboxylic acids, styrenesulfonic acid, acrylamide, methacrylamide, N-substituted acrylamides, N-substituted methacrylamides, and acrylamide propanesulfonic acid, 80-20 parts by weight of a vinyl monomer, the sum of said low molecular weight polymer and vinyl monomer being 100 parts by weight, 0.01-5 parts by weight of a polymerization initiator and 0-3 parts by weight of a crosslinking agent, dispersing the resultant mixture in water and then polymerizing the same.

2. The toner resin as claimed in claim 1, wherein the vinyl monomer is at least one monomer selected from acrylic esters, methacrylic esters, styrene, dialkyl fumarates, acrylonitrile, methacrylic acid, cinnamic acid, fumaric monoesters, acrylamide and methacrylamide.

3. The toner resin as claimed in claim 1, wherein the low molecular polymer has been obtained by polymerizing at 190°-230° C. a liquid mixture of a vinyl monomer, a solvent and a polymerization initiator.

4. The toner resin as claimed in claim 1, wherein the low molecular polymer has a number average molecular weight of 1,500-2,800.

5. The toner resin as claimed in claim 1, wherein the glass transition temperature of the low molecular polymer is in a range of 45-70° C.

6. The toner resin as claimed in claim 1, wherein the weight ratio of the low molecular polymer to the vinyl monomer is 30/70-70/30.

7. The toner resin as claimed in claim 1, wherein the polymerization has been effected by mixing the low molecular polymer with the vinyl monomer to dissolve the former in the latter, dissolving the crosslinking agent and polymerization initiator, adding water and a dispersion stabilizer to bring the resultant mixture into a suspension-like state, and then heating and polymerizing the mixture.

8. The toner resin as claimed in claim 1, wherein the crosslinking agent has been used in an amount of 0.05-3 parts by weight per 100 parts by weight of the sum of the low molecular polymer and vinyl monomer.

9. The toner resin as claimed in claim 1, wherein the polymerization initiator comprises a combination of (A) a first initiator component for promoting the polymerization reaction and (B) a second initiator component for reducing any remaining portion of the monomer.

10. The toner resin as claimed in claim 9, wherein the first initiator component (A) and second initiator component (B) have been used in amounts of 0.01-4.0 parts by weight and 0-1.0 part by weight, respectively, per 100 parts by weight of the sum of the low molecular polymer and vinyl monomer.

11. The toner as claimed in claim 1, wherein the polymerization has been effected in two stages which comprise first-stage polymerization at 60°-90° C. and second-stage polymerization at 80°-120° C., wherein said second-stage polymerization is conducted at a temperature higher than said first-stage polymerization.

12. The toner resin as claimed in claim 1, wherein the glass transition temperature is 50°-75° C.

13. The toner resin as claimed in claim 1, further comprising one or more blending resins and one or more additives.

14. A toner comprising the toner resin as claimed in claim 1.

15. A toner comprising 100 parts by weight of the toner resin as claimed in claim 1 and 5-250 parts by weight of a coloring agent.

16. The toner resin as claimed in claim 1, wherein said low molecular weight polymer is prepared by polymerizing monomers selected from the group consisting of acrylic esters, methacrylic esters, styrene, dialkyl fumarates, acrylonitrile, methacrylic acid, cinnamic acid, fumaric monoesters, acrylamide and methacrylamide.

* * * * *